US005792499A

United States Patent [19]

Atwell

[11] Patent Number: 5,792,499
[45] Date of Patent: Aug. 11, 1998

[54] METHOD FOR REDUCING SYRUPING IN REFRIGERATED DOUGHS

[75] Inventor: William Alan Atwell, Andover, Minn.

[73] Assignee: The Pillsbury Company, Minneapolis, Minn.

[21] Appl. No.: 590,194

[22] Filed: Jan. 23, 1996

[51] Int. Cl.$^6$ .................................................. A21D 2/00
[52] U.S. Cl. .......................... 426/549; 426/94; 426/567; 426/658
[58] Field of Search ................... 426/549, 567, 426/658, 94

[56] References Cited

U.S. PATENT DOCUMENTS

| | | | |
|---|---|---|---|
| 2,152,602 | 3/1939 | Ott | 99/150 |
| 3,620,763 | 11/1971 | Hans | 99/92 |
| 3,733,208 | 5/1973 | Sato et al. | 99/90 |
| 4,225,628 | 9/1980 | Lynn | 426/549 |
| 4,690,829 | 9/1987 | Usui | 426/661 |
| 4,774,099 | 9/1988 | Feeney et al. | 426/552 |
| 4,803,084 | 2/1989 | Shine | 426/20 |
| 4,904,493 | 2/1990 | Petrizzelli | 426/549 |
| 5,080,915 | 1/1992 | Zock | 426/94 |
| 5,080,919 | 1/1992 | Finley et al. | 426/94 |
| 5,108,765 | 4/1992 | Maat et al. | 426/20 |
| 5,133,984 | 7/1992 | Murphy et al. | 426/496 |
| 5,178,893 | 1/1993 | Seewi et al. | 426/549 |
| 5,342,641 | 8/1994 | Masutake et al. | |

FOREIGN PATENT DOCUMENTS 2 673 360 A  9/1992  France .

OTHER PUBLICATIONS

Becker et al.,"Joy of Cooking", p. 618, 1975.
Beldman et al., Some Characteristics of B–D–xylopyranosidases, a–L–arabinofuranosidases and an arabionxylan a–L–arabinofuranohydrolase from wheat bran and germinated wheat. No Date.
Beldman et al., Arabinoxylan Degrading Enzymes of Wheat Flour Effects on the Quality of Doughs and Breads, Department of Food Science. No Date.
Cole, Some Physicochemical Properties of a Wheat Flour Hemicellulose in Solution, Jul. 1969, vol. 46, Properties of Wheat Flour Hemicellulose.
Lenz et al., The Influence of Additives of Hemicellulose on the Flow Characteristics of Wheat Flour Dough, Apr. 1984, *Rheologica Acta*, 23:570–572.
Morrison & Boyd, Organic Chemistry, Fourth Edition, 1983, Allyn & Bacon, Inc., Boston.
Neukom et al., Recent Investigations on Wheat Flour Pentosans, Aug. 1968, vol. 46, Properties of Wheat Flour Hemicellulose.
Yalpani, Polysaccharides Synthesis, Modifications and Structure/Property Relations, 1988, vol. 36, Studies iin Organic Chemistry.
Die Nahrung, vol. 30, 1986, pp. 959–965, XP000675907, Lenz, J. et al.: "Die Eignung von Hemicellulose aus Buchenholzzellstoff zur Erhöhung des Ballaststoffgehaltes von Back –und Teigwaren."
AN 95(07):M0079 Biliaderis et al. "Food Chemistry" 1995, 53(2) pp. 165–171.

*Primary Examiner*—Lien Tran
*Attorney, Agent, or Firm*—Merchant, Gould, Smith, Edell, Welter & Schmidt, P.A.

[57] ABSTRACT

A method of reducing syruping in refrigerated dough compositions is disclosed. The method includes formulating a dough composition comprising flour, preferably wheat flour, and water, and adding a xylan compound to the refrigerated dough composition at a specified concentration. Upon refrigerating and storing the dough composition, reduced syruping is noted. Also disclosed is a baked good comprising this dough product and a method of inhibiting the enzymatic degradation of arabinoxylans and syruping in refrigerated dough compositions. The method is useful for any number of doughs which are subjected to refrigerated storage, such as, for example, bread doughs, biscuit doughs, roll doughs, and the like.

35 Claims, 1 Drawing Sheet

METHOD FOR REDUCING SYRUPING IN REFRIGERATED DOUGHS

FIELD OF THE INVENTION

The invention relates generally to increasing the storage stability of refrigerated dough. More specifically, the invention relates to increasing the storage stability of refrigerated doughs by reducing enzyme activity resulting from the natural constituents of the flour in the refrigerated dough.

BACKGROUND OF THE INVENTION

It is well recognized that refrigerated dough is subject to "syruping" which reduces the shelf life of these dough products once produced and packaged. Syruping describes the separation of a brownish fluid from the dough after it has been stored under refrigerated conditions for extended periods of time. This fluid is believed to result partially from the enzymatic degradation of arabinoxylans, which are a naturally occurring water soluble constituent of flour that acts as water binding agents in the dough. Once the arabinoxylans are degraded, by naturally occurring enzyme activity in the dough, they lose their water binding capacity. Water which was originally bound up by the arabinoxylan molecules is then freed and "syrups" out of the dough. This may result in loss of dough rheological and organoleptic properties, dough package failure, or even complete product failure.

Previously, this phenomenon has been controlled by using special types of flour with notably stable water binding capacity. This is often dictated by the type of growing season, which is often unpredictable and cannot be controlled. Other methods include using less water to make the dough and using gums to act as water binding agents. For example, Lens et al., Rheologica Acta in 1984, 23(5) 570–572, disclose that water absorption capacity of the dough was increased linearly by the addition of high concentrations of water-insoluble hemicelluloses such as xylan.

Other agents have been added to doughs to create various effects within the doughs. For example, Ott, U.S. Pat. No. 2,152,602 discloses the addition of anti-staling agents such as polyhydric alcohols, monosaccharides, disaccharides, and trisaccharides to dough compositions.

Hans, U.S. Pat. No. 3,620,763 discloses a refrigerated batter which may be packaged in a pressurized container and is stable against the coalescence of gas and migration and syneresis of water when stored under refrigerated conditions. The batter has added to it a polysaccharide hydrophobic film former such as cellulose or a cellulose derivative.

Sato, U.S. Pat. No. 3,733,208 discloses the uniform incorporation of microbial heteropolysaccharides into doughs for bakery products to enhance the stability of the doughs. Lynn, U.S. Pat. No. 4,225,628 discloses the preparation of a citrus fiber additive for food products for use with grain flour and other food applications as a food additive. Usui, U.S. Pat. No. 4,690,829 discloses a method for preventing the retrogradation of foodstuffs containing starchy material which includes the optional addition of a polysaccharide to the composition.

Feeney et al., U.S. Pat. No. 4,774,099 discloses the improvement of baked good flavor, texture, tolerance to underbaking, height and moisture attention through the addition of edible organic fibers such as cellulose fibers.

Shine, U.S. Pat. No. 4,803,084 discloses a shelf stable soft dough product having a water activity of about 0.75 or less produced by preparing a leavened dough and adding one antifirming agent to that dough which may include an oligosaccharide such as a monoglyceride ester, maltodextrin, or corn syrup solids.

Petrizzelli, U.S. Pat. No. 4,904,493 discloses a shelf stable dough product having a water activity of about 0.6 to 0.8. The dough product includes an inactivated flour has zero alpha amylasic activity, reduced lipasic and peroxidasic activity and a water content from about 3 to 6%.

Zock, U.S. Pat. No. 5,080,915 discloses a method for preparing puff pastry in which puff pastry is formed using flour while adding water and a fat composition, in which the fat composition comprises fat and vegetable fiber material in a weight ratio between 1:1 and 20:1. The vegetable fiber material preferably comprises wheat bran. The composition also has fat or a mixture of fats and a vegetable fiber material in a weight ratio between 1:1 and 20:1. The vegetable fiber material may comprise bran.

Finley et al., U.S. Pat. No. 5,080,919 discloses baked products having reduced sucrose content and doughs for the production thereof. Maat et al., U.S. Pat. No. 5,108,765 discloses a composition which comprises cellulase, xylanase, peroxidase, and optionally an oxidase. The composition may be incorporated in flour as an additive to dough for bread or other baked dough products such as puff pastry. Flour compositions comprising a bread improver composition of cellulase, peroxidase and optionally an oxidase, and process for improving baked goods by using same are also disclosed.

Murphy et al., U.S. Pat. No. 5,133,984 discloses doughs and batters are prepared which contain hydrated polysaccharide hydrocolloid, hydrated insoluble fiber, and hydrated protein preferably at a weight ratio of 1:0.8–6:1.1–4.5. The hydrated materials are added to the dough or batter formulation as an aqueous dispersion. The resulting dough and batter can be baked in a conventional manner. This invention is particularly useful in the preparation of fat-free baked goods.

Seewi et al., U.S. Pat. No. 5,178,893 discloses a ready-to-bake dough which is storage stable at room temperature comprises flour, edible fat, texturizer and a controlled amount of water. When the dough is prepared, the flour and fat are pretreated by forming an essentially homogeneous premix. The premix is further processed by adding water and heating, or by heating under pressure with or without the addition of water. The dough can be used to make bread, cookies, biscuits, pastries and the like.

Of all of the disclosed compositions, no efforts have been made to control syruping at the theoretical level of activity. Rather, syruping has generally been controlled by using absorptive agents, changing dough formulation, (i.e. using less water), or by varying dough constituent type, character, or quality. The problems presented by these methods include adverse effects on dough taste, texture and, rheology. These doughs can also present processing problems due to the reduction of constituents such as water which aid in processing.

As a result, there is a need for an improved method of reducing dough syruping which does not affect the organoleptic characteristics of the dough.

SUMMARY OF THE INVENTION

In accordance with a first aspect of the invention, there is provided a method of reducing syruping in refrigerated dough compositions of flour and water. The method comprises the step of adding an amount of xylan compound effective to reduce the amount of syruping in the dough during refrigerated storage. In the context of this invention, storage at refrigerated temperatures is about 0° C. to 15° C.

In accordance with an additional aspect of the invention, there are provided doughs and baked goods resulting from and using the method of the invention to reduce syruping in the dough.

In accordance with an alternative aspect of the invention there is provided a method of inhibiting the enzymatic degradation of arabinoxylans and, in turn, syruping in refrigerated dough compositions resulting therefrom which includes adding a xylan compound to the refrigerated dough composition and refrigerating the dough composition.

Syruping involves a degradation of the dough by separation into a dough component and a viscous liquid. Syruping is caused by the enzymatic hydrolysis of the native arabinoxylans of wheat flour. In their native state the arabinoxylan component can bind up to about one quarter of the water in a freshly formulated dough. When this polymer is hydrolyzed the doughs ability to bind water is radically compromised and free water (syrup) is released.

Arabinoxylans are primarily composed of two, five carbon sugars, xylose and arabinose. In the native polymer the xylose is arranged in a linear chain and short side chains of arabinose are attached. Without the arabinose side chains the xylose containing backbone is termed an unsubstituted xylan compound. While arabinoxylans are predominantly soluble, unsubstituted xylan compounds are insoluble and will precipitate from solution. The previously favored hypothesis for the mechanism for syruping therefore, was that the enzymes responsible for removing the arabinose side chains were primarily responsible for syruping, since the product of their action was the unsubstituted xylan compound which was not very hygroscopic relative to the native arabinoxylan substrate.

Several specific native wheat enzymes are responsible for the degradation of arabinoxylans. One of these categories of enzymes is known as the endo-xylanases. These enzymes attack the xylose containing backbone of the arabinoxylan molecule. It was hypothesized during this research that these enzymes were primarily responsible for syruping, as opposed to the enzymes that sever the arabinose side chains. Based on the theory that endo-xylanases are responsible for syruping, we discovered that unsubstituted xylan compounds are good competitive inhibitors of endo-xylanases.

Additionally, since xylan compounds are relatively hydrophobic, they do not affect dough rheology and hence the processability of the dough dramatically. Xylan compounds from birchwood and oat spelts were procured and added to a dough formula, typical of refrigerated doughs. The products were stored under stressed conditions and centrifugal (free) liquid was measured over time. Results indicate that at the 1% level of xylan compound supplementation (based on total formula) the generation of centrifugal liquid was delayed and reduced.

We have found that syruping may be reduced to less than about 6.0 wt-%, preferably less than about 0.05 to 0.24 wt-%, more preferably less than about 0.1 wt-% after about 170 hours of storage; less than about 21 wt-% and preferably less than about 15 wt-% after about 500 hours; and less than about 23.5 wt-% and preferably less than about 20 wt-% after about 840 hours of storage at temperatures as great as 50° F.

BRIEF DESCRIPTION OF THE DRAWING

The FIGURE is a graphical depiction of the results of Working Example 1.

DETAILED DESCRIPTION OF THE PREFERRED EMBODIMENT

Figure 1:
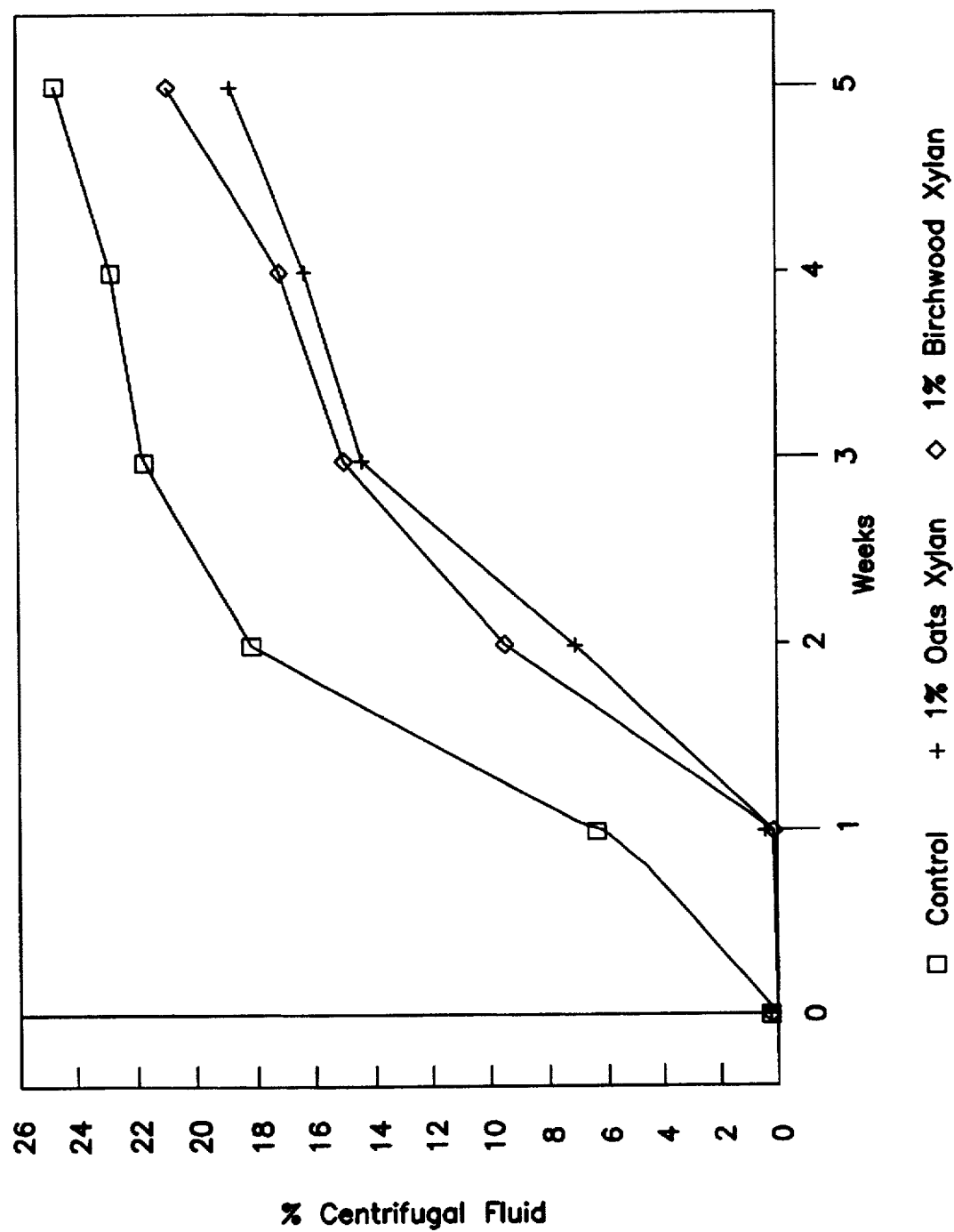

The invention is a method of reducing syruping in refrigerated dough compositions. The refrigerated dough compositions may comprise any variety of flours and water. The method includes the addition of an amount of xylan compound effective to reduce the amount of syruping in the dough during refrigerated storage. The invention also includes refrigerated doughs and baked products resulting from the method of the invention.

THE REFRIGERATED DOUGH

Compositions which may be used with the method of the invention generally comprise a dough. Generally doughs provide physical stability to foodstuffs while also providing consistency and thermal stability for a foodstuff which may be baked through any assorted processes. Additionally, the dough may provide a medium which is preferably compatible with a foodstuff or topping with which it is combined and physically adequate to support and deliver this foodstuff or topping.

The dough may comprise any number of constituents consistent with this function. Generally, the dough of the invention comprises a processed or unprocessed flour which may be a white flour, a whole grain constituent, or a combination thereof. Grains useful for defining the dough of the invention include grain constituents such as flours, germ, and bran from wheat, oats, rye, sorghum, barley, rice, millet, and corn among others. Generally, the dough used in the invention will have flour present in a concentration ranging from about 35 wt-% to 70 wt-%, preferably about 40 wt-% to 65 wt-%, and most preferably about 45 wt-% to 60 wt-%.

The dough of the invention may also comprise water. Preferably, the dough moisture will range from about 25 wt-% to 40 wt-%, preferably from about 27 wt-% to 38 wt-%, and most preferably about 25 wt-% to 35 wt-% to optimize texture.

Another means of measuring the concentration of water is in terms of the ratio of water to flour in the dough. To this end, we have found that a flour to water ratio of about 1.0 to 3.0, preferably about 1.2 to 2.5, and most preferably 1.5 to 2.0 to be most conducive to optimal crispness.

Along with other constituents, the dough of the invention may also comprise a leavening agent. The leavening agent may be present in the dough composition at concentrations ranging from about 0 wt-% to 3 wt-%, preferably about 0.5 wt-% to 2 wt-%, and most preferably about 1 wt-% to 2 wt-%.

Leavening agents useful in the invention include air, steam, yeast and baking powders such as those containing sodium bicarbonate and the combination of one or more baking acids with sodium bicarbonate. Baking acids useful for chemical leavening in dough mixtures include monocalcium phosphate monohydrate, sodium aluminum sulfate, sodium acid pyrophosphate, sodium aluminum phosphate, dicalcium phosphate, glucono-delta lactone, and potassium hydrogen tartrate, and mixtures thereof. One or more baking acids may be combined with the sodium bicarbonate to form the chemical leavening agent. Preferably, the dough of the invention comprises from about 0 wt-% to 2.0 wt-% sodium bicarbonate.

Along with the leavening agent, the dough of the invention may also comprise any number of other constituents as known to those skilled in the art including sugar, salt, emulsifiers, dyes, flavorants, and other constituents.

Emulsifiers may be incorporated into the dough to influence texture and homogeneity of the dough mixture, to increase dough stability, to improve eating quality, and to prolong palatability. Emulsifiers aid in the incorporation and retention of air into the dough, and have an effect on the subdivision of the air cell so as to effect the final grain and volume of the cooked dough layer.

Emulsifying agents which may be used include mono- and di-glycerides of fatty acids, propylene glycol mono- and di-esters of fatty acids, glycerol-lacto esters of fatty acids, ethoxylated mono- and di-glycerides, lecithin, or equivalents thereof, and mixtures thereof. Emulsifying agents may be used singly or in combination. Preferred emulsifiers include mixtures of propylene glycol, mono- and di-esters of fatty acids plus mono- and di-glycerides and lecithin, or single mono- and di-glycerides.

Among the optional ingredients which may be added to the dough mixture are dough relaxants, various enriching ingredients, and fat. Dough relaxers such as 1-cysteine, may be added to facilitate sheeting of the dough particularly with industrial size equipment. Additionally, the dough of the invention may comprise a plasticizer such as a fat or fat substitute present in the form of any number of natural or synthetic oils including various vegetable oils such as corn oil, soy bean oil and the like. Also useful for defining the fat content of the dough of the invention are oils derived from animals such as shortening or lard as well as synthetic plasticizers such as propylene glycol or glycerol. The fat content of the dough of the invention can generally range from about 0 wt-% to 20 wt-%, preferably about 0 wt-% to 15 wt-%, and most preferably about 0 wt-% to 10 wt-% to optimize texture.

Enrichment nutrients which may be added to the dough may include thiamine, riboflavin, niacin, iron, calcium, and mixtures thereof. Shortening such as animal and vegetable fats and oils may be added as a tenderizer, preservative, and to build air cell structure to provide a dough with a desirable mouthful. Other ingredients which may be optionally added to the dough mixture include seasonings, extenders, preservatives, and food colorings as desired.

XYLAN COMPOUNDS

In addition to other constituents which may be included with the refrigerated doughs and baked goods formulated in accordance with the invention, the dough also contains a polysaccharide, preferably a xylan compound. These xylan compounds function to reduce the syruping which may otherwise take place during refrigerated storage of the dough composition. As a result, the amount of syruping in the dough composition is reduced. Further, the quality of the dough, as well as the quality of the resulting baked product is increased.

Xylan compounds useful in the method in composition of the invention include xylan, substituted xylan, xylan derivatives, and mixtures thereof. Xylan compounds are generally regarded as a hemicellulose, which is associated with the cellulose in many plants. Exemplary xylan compound sources include wood, cereal grains, oil seeds, and mixtures thereof. Xylan compounds are polysaccharides which may have a certain level of substitution to include moieties attached to the xylose containing backbone. For example, the xylose backbone may have intermittent substitutions with arabinose moieties in an arabinoxylan structure. Common substituents attached to the xylan chain include arabinose, glucuronic acid, glucose, galactose, galacturonic acid, and mixtures thereof attached to the same xylan chain. Xylan may also be derivatized with processes known to those of skill in the art to provide compounds which are also useful in this invention. Common processes include phosphorylation, acetylation, hydrolysis, crosslinking, substitution, oxidation, chlorination, and mixtures thereof.

It is thought that the activity of endo-xylanases on the xylan backbone of native arabinoxylans is affected by steric hindrance posed by the arabinose side chains. To competitively inhibit the activity of endo-xylanases on native arabinoxylans, therefore, it is preferred that the added xylan compounds pose, at most, about the same level of steric hindrance as native arabinoxylans. More preferably, the added xylan compounds should pose less steric hindrance to endo-xylanases than native arabinoxylans, making the added xylan compounds a more favorable substrate for the endo-xylanase enzyme activity. The degree of substitution and/or derivatization of the added xylan compounds should preferably be such that the substituted or derivatized xylan is a sterically competitive substrate for the endo-xylanase activity.

While unsubstituted xylan compounds certainly work within the method of the invention, xylan compounds comprising as much as 40 wt-% of a substituent other than xylan also work within the method of the invention. Preferably, xylan compounds having as much as 30 wt-% arabinose substituents work within the invention to reduce the amount of syruping within the dough composition. Generally, when the xylan compound contains arabinose, the ratio of arabinose to xylan compound is less than about 0.4, preferably ranging from about 0 to 0.3.

Generally, the concentration of xylan compound useful in the method of the invention ranges from about 0.1 wt-% to 3.0 wt-%, preferably from about 0.5 wt-% to 2.5 wt-%, and most preferably from about 0.9 wt-% to 2.1 wt-% based on the total weight composition of the dough.

While we do not wish to be bound by any specific theory, one theory on the activity of the xylan compound stems from the enzymatic hydrolyses of native arabinoxylans. Syruping involves a degradation of the dough. Specifically, the dough separates into a dough component and a viscous liquid. The liquid expelled from the dough is brown and resembles maple syrup. Syruping is generally believed to be caused by the enzymatic hydrolysis of native arabinoxylans of wheat flour, in particular. Arabinoxylans are commonly found in the cell walls of wheat. In the native state, the arabinoxylan component can bind up to about one quarter of the water in a freshly formulated dough.

When this polymer is hydrolyzed, the ability to bind water is radically reduced and free water is released. Previously, it was hypothesized that the enzymes able to remove arabinose side chains had the highest effect on syrup generation since the resultant unsubstituted xylan does not bind water very well. Contrarily, during the course of this research it was hypothesized that endo-xylanases, which hydrolyze the xylan backbone of arabinoxylans, were the enzymes with the highest effect on syrup generation. Research based on this hypothesis indicates that unsubstituted xylan does reduce the rate of syrup generation. It is likely that xylan is acting as a competitive inhibitor in the system to reduce the amount of syrup generated. Additionally, since xylan compounds with a relatively low amount of substitution are relatively hydrophobic, they should not radically affect dough rheology and hence not affect the processability of the dough.

WORKING EXAMPLES

The following working examples are intended to provide a nonlimiting illustration of the invention.

WORKING EXAMPLE 1

This experiment evaluated the effect of two commercially obtained xylans on the volume of liquid obtained from centrifugation (centrifugal fluid) of refrigerated dough products with storage time. The products were formulated to be a high syruping and were stored at 50 degrees Fahrenheit to accelerate dough separation. The xylan compounds used were obtained from the Sigma Chemical Company: birchwood xylan (product no. X-0502, lot 84H0351) and oat spelt xylan (product no. X-0627, lot 123H1003).

Doughs were produced using a Hobart mixer (McDuffey bowl) with the formulas and mixing times in Table 1. Pack weights of 200 grams were used and doughs were packed in spirally wound composite cans commonly used for refrigerated dough products. They were proofed at room temperature until 5 psi was generated within the container. The containers were then stored at 50 degrees Fahrenheit.

Controls (no added xylan compound) and three levels (0.01%, 0.1% and 1%) of added xylan compound were evaluated for each xylan type.

Initially and at one week intervals one can of each variable was evaluated for centrifugal liquid. Table 1 shows the formula for Controls 1 and 2 as well as Examples 1A through 1C using the birchwood xylan compound from Sigma. Examples 1D through 1F were formulated in the same manner as Examples 1A through 1C, respectively, except for the use of xylan compounds derived from oats.

TABLE 1

Flour/water ratio: 1.66

|  | Control 1 and 2 | 1A | 1B | 1C |
|---|---|---|---|---|
| Flour | 59.78 | 59.77 | 59.68 | 58.81 |
| Water | 35.92 | 35.92 | 35.92 | 35.92 |
| E-Soda | 1.32 | 1.32 | 1.32 | 1.32 |
| GDL | 1.53 | 1.53 | 1.53 | 1.53 |
| Salt | 1.46 | 1.46 | 1.46 | 1.46 |
| Xylan | 0.00 | 0.01 | 0.10 | 0.97 |
| Totals | 100.00 | 100.00 | 100.00 | 100.00 |

The standard Hobart mixing speeds and times used were as follows:

Mixing 1st stage: ½ min speed 1, 2 min speed 2
Mixing 2nd stage: ½ min speed 1, 5 min speed 2

The amount of syruping was determined by the formulation of various doughs, storing those dough compositions, and then determining the volume of centrifuged liquid. The analysis was run against a control which did not have any added xylan compounds in the dough formulation.

The assay included centrifuging the dough after storage. In this instance, the dough and centrifuge tube were weighed and then spun in a centrifuge after storage. The dough, having a higher relative mass and density, flows to the bottom of the tube while the supernatant flows to the top of the tube. At that time, the supernatant may be decanted from the tube and its relative proportion to the initial dough composition determined by reweighing the remaining dough and tube.

Generally, centrifuging may be conducted for a period of time necessary to fully form a two-phase composition wherein the supernatant separates from the dough. To achieve this, it is preferred that the centrifuge be capable of generating a relative centrifugal force of at least about 18,670 G. The samples in this example were centrifuged at 12,500 rpm for 30 minutes at 24.5° F.±1.5° F.

The doughs handled well during processing and no major affects on rheology were observed.

| Sample | % Syrup |
|---|---|
| 0 Week Centrifuge Test | |
| Control 1 | 0.20 |
| Control 2 | 0.10 |
| Example 1A | 0.10 |
| Example 1B | 0.10 |
| Example 1C | 0.00 |
| Example 1D | 0.07 |
| Example 1E | 0.07 |
| Example 1F | 0.03 |
| 1 Week Centrifuge Test | |
| Control 1 | 6.15 |
| Control 2 | 6.56 |
| Example 1A | 5.84 |
| Example 1B | 5.51 |
| Example 1C | 0.07 |
| Example 1D | 6.59 |
| Example 1E | 4.56 |
| Example 1F | 0.24 |
| 2 Week Centrifuge Test | |
| Control 1 | 19.41 |
| Control 2 | 16.91 |
| Example 1A | 18.03 |
| Example 1B | 17.32 |
| Example 1C | 9.44 |
| Example 1D | 17.01 |
| Example 1E | 16.19 |
| Example 1F | 6.97 |
| 3 Week Centrifuge Test | |
| Control 1 | 21.75 |
| Control 2 | 21.56 |
| Example 1A | 21.26 |
| Example 1B | 21.53 |
| Example 1C | 15.03 |
| Example 1D | 21.56 |
| Example 1E | 20.88 |
| Example 1F | 14.33 |
| 4 Week Centrifuge Test | |
| Control 1 | 23.03 |
| Control 2 | 22.41 |
| Example 1A | 22.29 |
| Example 1B | 21.94 |
| Example 1C | 17.16 |
| Example 1D | 22.36 |
| Example 1E | 21.21 |
| Example 1F | 16.29 |
| 5 Week Centrifuge Test | |
| Control 1 | 25.07 |
| Control 2 | 24.15 |
| Example 1A | 23.79 |
| Example 1B | 23.28 |
| Example 1C | 20.85 |
| Example 1D | 23.59 |
| Example 1E | 22.69 |
| Example 1F | 18.81 |

The effect of xylan compound addition on dough rheology did not appear to be great even at the one percent level in the doughs processed for this study. A graphical representation of these results may be seen in the FIGURE.

WORKING EXAMPLE 2

To determine the effect of various levels of xylan supplementation on the rheological characteristics of dough an additional study was undertaken.

Birchwood xylan (catalogue #X-0502, lot 84H0351) and oat spelt xylan (catalogue #X-0627, lot 123H1003) were obtained from Sigma Chemical Company (St. Louis, Mo.). Each xylan was dry blended with the flour at the 0.5%, 1.0%, and 2.0% levels.

The effect of the addition of the xylan compounds was measured using a Brabender farinograph available from C. W. Brabender Instruments, Inc., Sough Hackensack, N.J., with a circulating water bath which held the temperature at 15° C. The farinograph mixed the samples at 63 rpm. For each example, the weight of flour equivalent to 300 grams, at a 14% moisture basis, was placed into the farinograph bowl. The farinograph was then turned on and adjusted to 63 rpm. While the mixer was running, a volume of water was added to the mix until the farinograph read 500 Brabender units ±20.

Water absorption by the dough compound increased at the rate of about 2.5% for every 1% added xylan. Farinograph arrival times increased about 1.5 minutes and peak times were increased about 2 minutes for each 1% xylan added. The effect of xylan on farinograph characteristics indicate higher absorption and longer mixing times. These absorptions and mixing times are within limits normally used in the processing of refrigerated doughs.

| Example | Sample Description | Farinograph % water absorption of flour |
| --- | --- | --- |
|  | 0% of XYLAN | 65.5 |
| Control 2A | 0.5% OAT XYLAN | 67.5 |
| Control 2B | 1.0% OAT XYLAN | 67.8 |
| Control 2C | 2.0% OAT XYLAN | 70.8 |
| Control 2D | 0.5% BIRCHWOOD XYLAN | 67.0 |
| Control 2E | 1.0% BIRCHWOOD XYLAN | 67.3 |
| Control 2F | 2.0% BIRCHWOOD XYLAN | 71.1 |

The above specification, examples and data provide a complete description of the manufacture and use of the composition of the invention. Since many embodiments of the invention can be made without departing from the spirit and scope of the invention, the invention resides in the claims hereinafter appended.

I claim as my invention:

1. A method of reducing syruping in refrigerated dough compositions, said refrigerated dough compositions comprising flour and water, said method comprising the step of adding an amount of xylan compound effective to reduce the amount of syruping in the dough during refrigerated storage wherein said xylan compound does not substantially affect dough rheology or processability.

2. The method of claim 1, wherein the refrigerated dough is stored at a temperature ranging from about 0° C. to 15° C.

3. The method of claim 1, wherein after about 170 hours the refrigerated dough composition comprises less than about 0.1 wt-% syruping, measured as a percentage of the total dough composition, after refrigerated storage at temperatures ranging from about 0° C. to 15° C.

4. The method of claim 1, wherein said xylan compound is present in said refrigerated dough compositions at concentrations ranging from about 0.1 wt-% to 3 wt-%.

5. The method of claim 1, wherein said xylan compound is derived from a source selected from a group consisting of wood, cereal grains, oil seeds, and mixtures thereof.

6. The method of claim 1, wherein said flour comprises of wheat flour.

7. The method of claim 1, wherein said xylan compound is selected from the group consisting of unsubstituted xylan, substituted xylan, a xylan derivative, and mixtures thereof.

8. The method of claim 7, wherein said xylan compound is a substituted xylan compound and comprises arabinose, the substituted xylan compound having a ratio of arabinose to xylan less than about 0.4.

9. A method of reducing syruping in refrigerated dough compositions, said method comprising the steps of:
(a) formulating a dough composition comprising from about 35 wt-% to 70 wt-% flour and from about 25 wt-% to 40 wt-% water;
(b) adding a xylan compound to said refrigerated dough composition at a concentration from about 0.1 wt-% to 3 wt-% of the composition as a whole; and
(c) refrigerating said dough composition, wherein said xylan compound reduces the amount of syruping in the dough during refrigerated storage and does not substantially affect dough rheology or processability.

10. The method of claim 9, wherein the refrigerated dough is stored at a temperature ranging from about 0° C. to 15° C.

11. The method of claim 9, wherein after about 500 hours the refrigerated dough composition comprises less than about 21 wt-% syruping, measured as a percentage of the total dough composition after refrigerated storage at temperatures ranging from about 0° C. to 15° C.

12. The method of claim 9, wherein said xylan compound is present in said refrigerated dough compositions at concentrations ranging from about 0.5 wt-% to 2.5 wt-%.

13. The method of claim 9, wherein said xylan compound is derived from a source selected from a group consisting of oats, birchwood, and mixtures thereof.

14. The method of claim 9, wherein said flour comprises wheat flour.

15. The method of claim 9, wherein said xylan compound is selected from the group consisting of unsubstituted xylan, substituted xylan, a xylan derivative, and mixtures thereof.

16. The method of claim 15, wherein said xylan compound is a substituted xylan compound and comprises arabinose, the ratio of arabinose to xylan is less than about 0.4.

17. A refrigerated dough composition resulting from the method of claim 9.

18. A refrigerated dough composition comprising:
(a) from about 35 wt-% to 70 wt-% flour;
(b) from about 25 wt-% to 40 wt-% water;
(c) from about 0.1 wt-% to 3 wt-% of a xylan compound, wherein said xylan compound reduces syruping in the dough during refrigerated storage.

19. The composition of claim 18, wherein said refrigerated dough comprises a plasticizer.

20. The composition of claim 18, wherein after about 500 hours of refrigerated storage, said dough comprises less than about 21 wt-% syrup, measured as a percentage of the total dough composition.

21. The composition of claim 18, wherein said xylan compound is selected from the group consisting of unsubstituted xylan, substituted xylan, a xylan derivative, and mixtures thereof.

22. The composition of claim 18, wherein said flour comprises wheat flour.

23. The composition of claim 21, wherein said xylan is a substituted xylan compound, and comprises arabinose wherein the ratio of arabinose to xylan is less than about 0.4.

24. The composition of claim 23, wherein said xylan compound is derived from a source selected from the group consisting of wood, cereal grains, oil seeds, and mixtures thereof.

25. The composition of claim 24, wherein said xylan compound is derived from oats.

26. The composition of claim 22, wherein after about 500 hours of refrigerated storage, said dough comprises less than about 15 wt-% syrup measured as a percentage of the total dough composition.

27. The composition of claim 23, wherein after about 500 hours of refrigeration storage, said dough comprises less than about 15 wt-% syrup measured as a percentage of the total dough composition.

28. A method of inhibiting the enzymatic degradation of arabinoxylan in refrigerated dough compositions said method comprising the steps of:
(a) formulating a dough composition comprising from about 35 wt-% to 70 wt-% flour and from about 25 wt-% to 40 wt-% water;
(b) adding a xylan compound to said refrigerated dough composition at a concentration of from about 0.1 wt-% to 3 wt-% of the composition as a whole; and
(c) refrigerating said dough composition, wherein said xylan compound reduces the enzymatic degradation of arabinoxylan in the dough during refrigerated storage and does not substantially affect dough rheology or processability.

29. The method of claim 28, wherein the refrigerated dough is stored at a temperature ranging from about 0° C. to 15° C.

30. The method of claim 28, wherein after about 500 hours the refrigerated dough composition comprises less than about 21 wt-% syruping, measured as a percentage of the total dough composition after refrigerated storage hours at temperatures ranging from about 0° C. to 15° C.

31. The method of claim 28, wherein said xylan is present in said refrigerated dough compositions at concentrations ranging from about 0.5 wt-% to 2.5 wt-%.

32. The method of claim 28, wherein said xylan is derived from a source selected from a group consisting of oats, birchwood, and mixtures thereof.

33. The method of claim 28, wherein said flour comprises of wheat flour.

34. The method of claim 28, wherein said xylan compound is selected from the group consisting of unsubstituted xylan, substituted xylan, a xylan derivative, and mixtures thereof.

35. The method of claim 28, wherein said xylan compound comprises arabinose, the ratio of arabinose to xylan is less than about 0.4.

* * * * *